J. M. C. FALKE AND T. H. M. SALCE.
VEHICLE.
APPLICATION FILED APR. 14, 1920.
1,407,648.
Patented Feb. 21, 1922.
2 SHEETS—SHEET 1.
Fig. 1
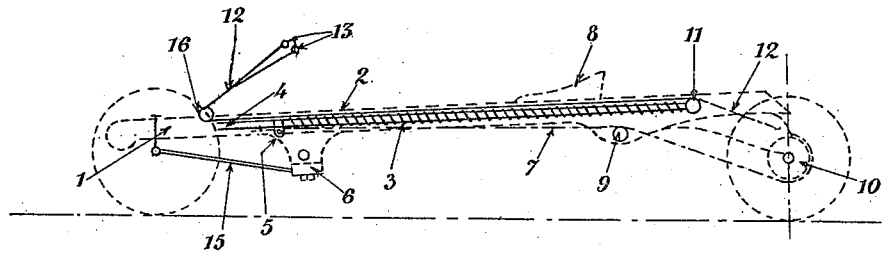
Fig. 2
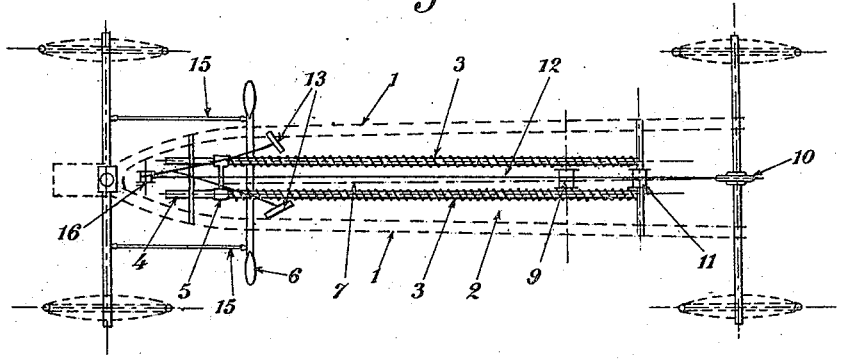
Fig. 3  Fig. 4  Fig. 5  Fig. 6  Fig. 7  Fig. 8
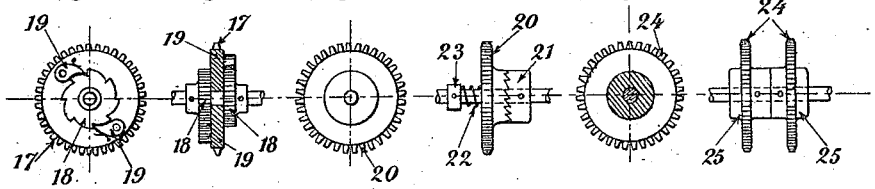
Fig. 9  Fig. 10  Fig. 11  Fig. 12
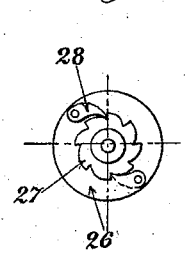 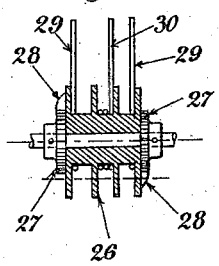 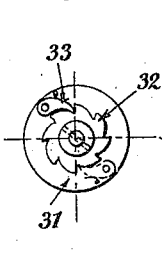 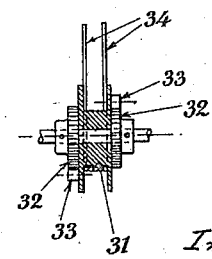
Inventors:
Jean Marie Constant Falke
and Théophile Henri Maximin Salce
By Lawrence Langner
Attorney.

J. M. C. FALKE AND T. H. M. SALCE.
VEHICLE.
APPLICATION FILED APR. 14, 1920.
1,407,648.
Patented Feb. 21, 1922.
2 SHEETS—SHEET 2.
Fig. 13
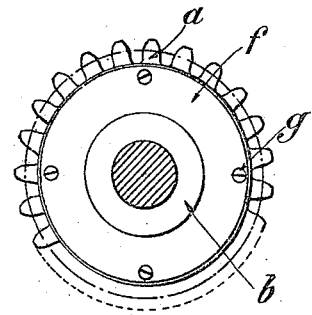
Fig. 14
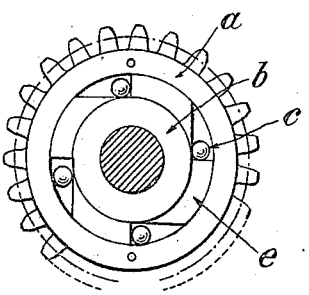
Fig. 15
Fig. 16
Fig. 17
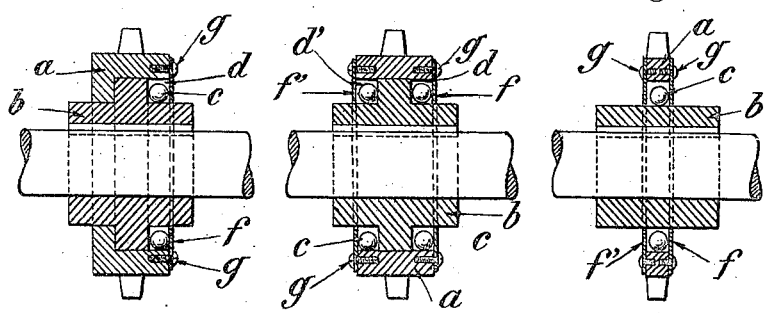
Fig. 18
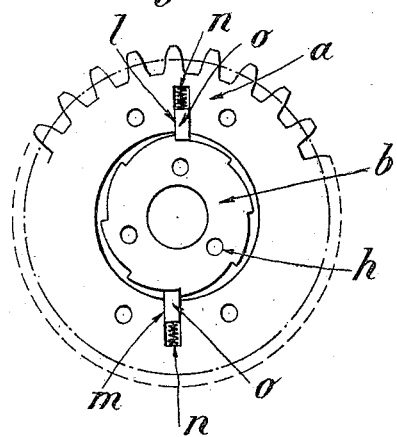
Fig. 19
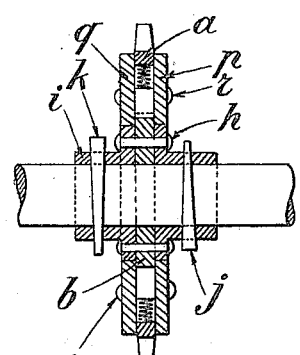
Inventors:
Jean Marie Constant Falke
and Théophile Henri Maximin Salce
By Lawrence Langner
Attorney.

UNITED STATES PATENT OFFICE.

JEAN MARIE CONSTANT FALKE, OF PARIS, AND THÉOPHILE HENRI MAXIMIN SALCE, OF LYON, FRANCE.

VEHICLE.

1,407,648.   Specification of Letters Patent.   Patented Feb. 21, 1922.

Application filed April 14, 1920. Serial No. 373,799.

*To all whom it may concern:*

Be it known that we, JEAN MARIE CONSTANT FALKE and THÉOPHILE HENRI MAXIMIN SALCE, citizens of the Republic of France, residing, respectively, at 11 Rue Simon Dereure, Paris, France, and 34 Rue Bugeaud, Lyon, Rhone, France, have invented new and useful Improvements in Vehicles, of which the following is a specification.

This invention relates to light manually propelled vehicle having the elongated form of and propelled in the manner of a racing skiff; said vehicle is mounted on four wheels, of which those arranged at the front are steering wheels and are worked by the feet by means of a suitable device. One of the rear wheels is a driving wheel and is worked by the combined efforts of the arms and legs of the driver or drivers seated in a sliding seat and pulling on handles rigidly attached to a cable or cables connected to a suitable one way driving device on the rear axle. Means are provided whereby the cable will be returned to its normal position when the pull thereon is released, to bring the handles into position for the next operation.

This device is preferably combined with a sliding or rolling seat for the rider adapted to move longitudinally on the chassis and a foot rest suitably located at the front part of the chassis so that the propulsion of the vehicle may be effected by a motion of the arms and legs similar to that of an oarsman.

In order to steer the vehicle by means of the feet, the aforesaid foot rest comprises a transverse rod rigidly connected by means of rods to the front steering axle which is pivotally connected to the chassis.

The accompanying drawings show, by way of example, a four-wheel vehicle constructed in accordance with this invention and several embodiments of the sprocket wheel or similar member mounted upon the rear axle through the medium of a free-wheel hub or one way clutch.

In the drawings:—

Fig. 1 is a side view of the vehicle.

Fig. 2 is the corresponding plan view.

Fig. 3 is a side view of a sprocket wheel with pawl and ratchet device mounted upon the rear axle.

Fig. 4 is a plan view thereof.

Figs. 5 and 6 are a side view and a plan view, respectively, showing a sprocket wheel with a spring claw-coupling.

Figs. 7 and 8 are a side view and a plan view respectively, showing a set of two sprocket wheels adapted for a two-seat vehicle.

Figs. 9 and 10 are a side view and a plan view, respectively, of the three-groove pulley provided with a ratchet device and used in connection with elastic connecting members having the same purpose as the springs.

Figs. 11 and 12 are a side view and a plan view, respectively, showing a single-groove pulley with a ratchet device.

Fig. 13 is a side view of a sprocket wheel with a one-way ball coupling between said wheel and axle.

Fig. 14 is a similar view to Fig. 13 with the cover removed.

Fig. 15 is a sectional view of the sprocket wheel shown in Fig. 13.

Fig. 16 is a sectional view of a modification in which the coupling comprises two ball races.

Fig. 17 is a sectional view of another modification to Fig. 15.

Fig. 18 is a side view of a sprocket wheel provided with another type of ratchet device, one cover being removed.

Fig. 19 is a sectional view of Fig. 18.

As shown in Figs. 1 and 2, the vehicle comprises two longitudinal frame members 1 upon which is mounted a floor 2. The frame members 1 are connected together to form the chassis of the vehicle, having an elongated shape similar to that of a racing skiff. The chassis is carried by the axles which are in turn carried by the front and rear wheels.

Underneath the floor are two tubes 4 secured at each end to tie-bars connecting the side frame members and extending throughout the whole length of the vehicle. Upon each tube 4 is mounted a compression spring 3 having the same length as the tube when extended. The front ends of the spring bear upon a slide 5 guided by the tubes 4. A chain 7 secured to said slide 5 is supported by a pulley 9 and engages the sprocket wheel 10 mounted upon the rear axle, at the middle thereof, through the medium of a free-wheel hub or one-way coupling.

The other end of the chain 7 is connected to a steel rope 12 passing upon a pulley 11 and extending forwardly underneath the floor. Said rope passes through an opening provided in the floor at the front part thereof, round a pulley 16 and then rearwards for a short length when it is doubled and provided with two handles 13.

The front axle is pivotally connected to the chassis and it is besides connected by means of bars 15 to a steering bar 6 arranged transversally underneath the chassis. Besides, said bar 6 constitutes an abutment for the feet of the rider, enabling him to operate the propelling device in exactly the same manner as an oarsman in propelling a boat, a sliding or rolling seat 8 being preferably provided to facilitate this motion.

When starting, the rider is seated on the carriage 8 located as near as possible to the front of the vehicle with his feet resting upon the ends of the bar 6 and his legs bent. Leaning his body forwardly he then grips the handles with both arms extended and pulls the rope 12 rearwardly while pushing with both feet against the foot rest 6 until his legs are entirely extended and his hands overreach his breast rearwards. During this operation the rope 12 and chain 7 actuate the sprocket wheel 10, thereby driving the rear axle and propelling the vehicle forward.

The rider returning then his limbs to their initial position, the springs 3 which have been compressed return the slide 5 to the forward position thereby permitting the chain to operate the sprocket wheel in the contrary direction, this motion however having no effect upon the axle as the pawl slides upon the ratchet without actuating same. By repeating this motion in the same manner as an oarsman manages his oars the vehicle will be propelled forwardly.

Figs. 3 to 19 show various types of mechanisms adapted to drive the rear axle.

Figs. 3 and 4 show a sprocket wheel provided with a ratchet 18 and two pawls 19.

Figs. 5 and 6 show a sprocket wheel 20 combined with a one-way claw coupling 21 comprising a spring 22 bearing upon a stop 23.

Figs. 7 and 8 show a double sprocket mechanism 24 used in connection with a vehicle for two riders, the two sprockets being mounted independently upon the rear axle through the medium of suitable couplings 25.

Figs. 9 and 10 show a pulley 26 having three grooves and provided with ratchet wheel 27 and pawls 28, the central groove being adapted to receive a steel rope 30 and the side grooves being adapted to receive elastic ropes 29 having the same purpose as the springs 3.

The pulley 26 may comprise only two grooves, one adapted to receive the india-rubber ropes, the other adapted to receive the steel rope, the former winding while the latter unwinds and inversely. The elastic rope and the steel rope are secured to each groove by means of hooks or other fastening device adapted to allow for interchangeability. This device allows of obtaining a three-wheel vehicle the front wheel of which constitutes the steering wheel.

Figs. 11 and 12 show a pulley 31 having a single groove and provided with a ratchet 32 and two pawls 33. This pulley is adapted to receive several turns of the steel rope 34, one end of which is secured to the spring or elastic rope while the other end is provided with the two grips 13.

In Figs. 13 to 17, the axle actuating mechanism comprises a sprocket $a$ engaged by the chain. This sprocket is mounted upon a ratchet wheel $b$ keyed to the wheel axle, preferably at the centre thereof, and actuates said wheel through the medium of balls $c$ movable in ball chambers $d$ formed by teeth $e$ and having tapering walls, so that when the sprocket wheel rotates in a clockwise direction the balls are pushed in the wider part of said chambers and have no action upon the sprocket wheel while when rotating in the contrary direction the balls become jammed between the tapering walls of said chambers thereby actuating the sprocket wheel.

In the case of a sprocket having a single ball race as in Fig. 15, the ratchet wheel $b$ is provided with teeth $e$ only on one of its side faces and the ball chambers are closed by a cover $f$ secured to the sprocket $a$ by means of screws $g$.

In Fig. 16, the device comprises two ball races $d$ and $d'$ and the arrangement is similar on both faces, the ball recesses being closed by means of plates $f$ $f'$.

In Figs. 17; the teeth $e$ extend from one face of the wheel to the other face and the single ball race is closed by two plates $f$ and $f'$.

In Figs. 18, 19, the ratchet wheel $b$ is secured by screws $h$ to a hub $i$ keyed to the wheel axle by means of wedges $j$, $k$.

The sprocket $a$ is provided internally with two recesses $l$, $m$ oppositely arranged and in which are slidably mounted bolts $o$ which are constantly pressed upon the ratchet wheel $b$ by means of springs $n$.

The sprocket is held in position upon the ratchet wheel by means of side cheeks $p$, $q$ secured together and to said sprocket by rivets or bolts $r$ and bearing upon the hub $i$.

It will be understood that the invention is not limited to the constructional details hereinbefore described and shown in the drawings and that various modifications may be effected without departing from the spirit of this invention.

Having now described our invention, what we claim as new and desire to secure by Letters Patent is:

1. The combination, with a vehicle, of a member slidably mounted upon the chassis and adapted to be moved longitudinally thereof, elastic members adapted to press constantly said slidable member forwardly, a flexible connecting member having one end attached to said slidable member, and being provided with two handles at the other end, said flexible connecting member engaging an actuating member intermediate said ends and being adapted to impart a rotary motion to said actuating member when moved longitudinally, a one-way coupling between said actuating member and a rear vehicle wheel adapted to drive the latter when the flexible connecting member is pulled rearwards against the action of the elastic members.

2. The combination, with a vehicle, of a member slidably mounted upon the chassis and adapted to be moved longitudinally thereof, elastic members adapted to press constantly said slidable member forwardly, a flexible connecting member having one end attached to said slidable member; and being provided with two handles at the other end and said flexible connecting member engaging an actuating member intermediate said ends and being adapted to impart a rotary motion to said actuating member when moved longitudinally, a one-way coupling between said actuating member, and a rear vehicle wheel adapted to drive the latter when the flexible connecting member is pulled rearwards against the action of the elastic members, a seat slidably mounted upon the chassis and a foot rest in front of said seat.

3. The combination, with a vehicle, of a member slidably mounted upon the chassis and adapted to be moved longitudinally thereof, elastic members adapted to press constantly said slidable member forwardly, a flexible connecting member having one end attached to said slidable member, and being provided with two handles at the other end, said flexible connecting member engaging an actuating member intermediate said ends and being adapted to impart a rotary motion to said actuating member when moved longitudinally, a one-way coupling between said actuating member and a rear vehicle wheel adapted to drive the latter when the flexible connecting member is pulled rearwards against the action of the elastic members, a seat slidably mounted upon the chassis and a foot-rest in front of said seat, said foot-rest being connected to the steering axle of the vehicle.

4. The combination, with a vehicle of a rotating member mounted on the driving axle of the vehicle, a one way coupling between said rotating member and said axle, elongated elastic members extending, when at rest, substantially over the whole length of the vehicle, and a flexible tracting member wound on the one way driving device, having one end connected to said elastic members and being provided with two handles at the other end, said flexible member driving said axle when pulled against the action of said elastic members.

In testimony whereof we have signed our names to this specification in the presence of two subscribing witnesses.

JEAN MARIE CONSTANT FALKE.
THÉOPHILE HENRI MAXIMIN SALCE.